United States Patent [19]

Thompson et al.

[11] 4,070,543
[45] Jan. 24, 1978

[54] ENCAPSULATED SPLICE ASSEMBLY AND METHOD

[76] Inventors: John T. Thompson, 244 Loring St., Los Angeles, Calif. 90024; George W. Gillemot, 2331 20th St., Santa Monica, Calif. 90405

[21] Appl. No.: 537,091

[22] Filed: Dec. 30, 1974

Related U.S. Application Data

[63] Continuation of Ser. No. 352,914, April 20, 1973, abandoned, which is a continuation of Ser. No. 159,714, July 6, 1971, abandoned.

[51] Int. Cl.$^2$ .......................... H01R 5/02; H01R 5/10; H01R 43/00; H02G 15/10
[52] U.S. Cl. ........................................ 174/87; 29/628; 150/.5; 156/49; 174/91; 174/93; 220/8; 222/490
[58] Field of Search .............. 174/87, 88 R, 76, 77 R, 174/74 A, 84 R, 91–93, 138 F, 21 R, 22 R, 22 C, 23 R, 135; 29/628; 156/49; 220/60, 42 A, 8, 209, 229; 222/490, 206, 207, 215, 490; 150/.5; 128/252; 206/384, 388, 389, 409, 485, 525, 528, 532; 215/11 R, 11 E, 247, 249; 401/261, 262, 266

[56] References Cited

U.S. PATENT DOCUMENTS

| 997,066 | 7/1911 | Krannichfeldt ........................ 174/87 |
| 1,048,255 | 12/1912 | Winkelmiller et al. .......... 222/207 X |
| 1,650,966 | 11/1927 | Smith ................................. 222/490 |
| 2,049,973 | 8/1936 | Nesmith ............................. 401/261 |
| 2,594,093 | 4/1952 | Thompson ...................... 206/528 X |
| 2,802,593 | 8/1957 | Slaughter .......................... 220/42 A |
| 2,891,101 | 6/1959 | Koliss ............................... 174/92 X |
| 2,941,562 | 6/1960 | Ripin ................................... 150/.5 |
| 3,068,316 | 12/1962 | Witt .................................... 174/135 |
| 3,139,064 | 6/1964 | Harle ........................... 215/11 R X |
| 3,504,099 | 3/1970 | Beinhaur ......................... 174/76 X |
| 3,518,358 | 6/1970 | Brown ............................. 174/93 X |

FOREIGN PATENT DOCUMENTS

| 636,486 | 1/1928 | France ............................... 222/490 |
| 1,532,626 | 6/1968 | France .................................. 174/93 |
| 83,951 | 11/1895 | Germany ........................... 222/490 |
| 165,507 | 12/1958 | Sweden ............................... 174/91 |
| 41,681 | 11/1907 | Switzerland ...................... 128/252 |
| 2,515 | 3/1896 | United Kingdom ............... 215/11 E |
| 599,184 | 3/1948 | United Kingdom ................ 206/525 |
| 693,371 | 7/1953 | United Kingdom .................. 174/93 |

Primary Examiner—Laramie E. Askin
Attorney, Agent, or Firm—Harris, Kern, Wallen & Tinsley

[57] ABSTRACT

A re-enterable, waterproof, encapsulated splice assembly and method for electrical conductors. The splice enclosure utilizes a pair of deep, cup-shaped housing members of supple material having a snug telescopic fit with one another about the splice junction. This junction is encapsulated in a water-repellent, non-setting, gel-like potting compound charged into the inner end of the two cup-shaped members prior to their assembly.

6 Claims, 5 Drawing Figures

U.S. Patent  Jan. 24, 1978  4,070,543
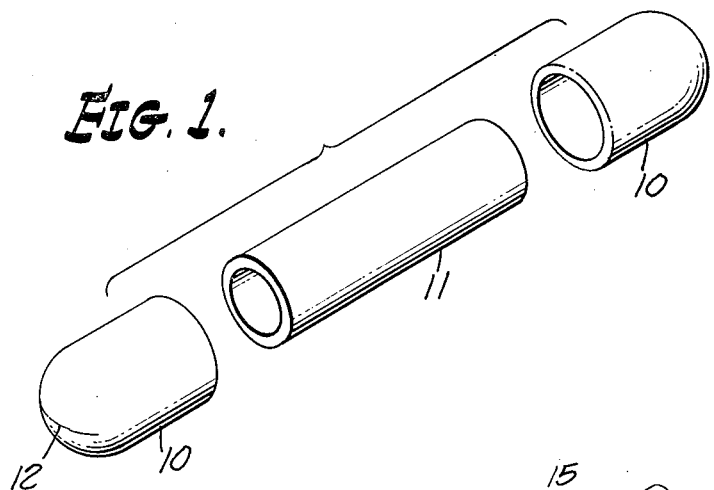
FIG. 1.
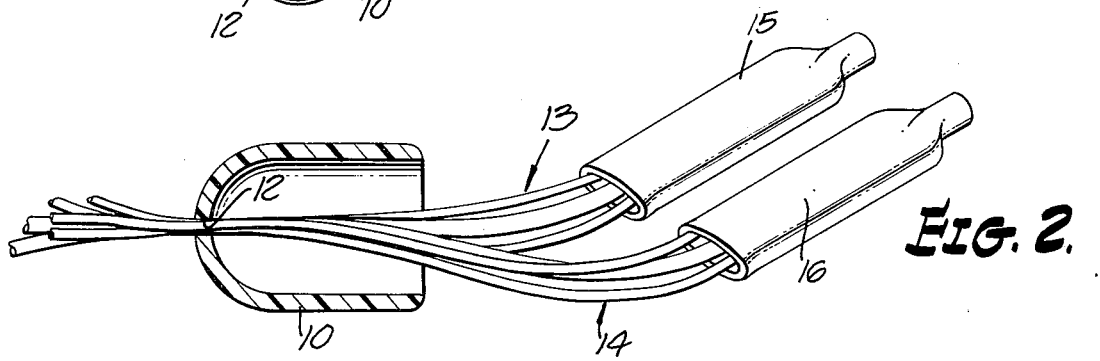
FIG. 2.
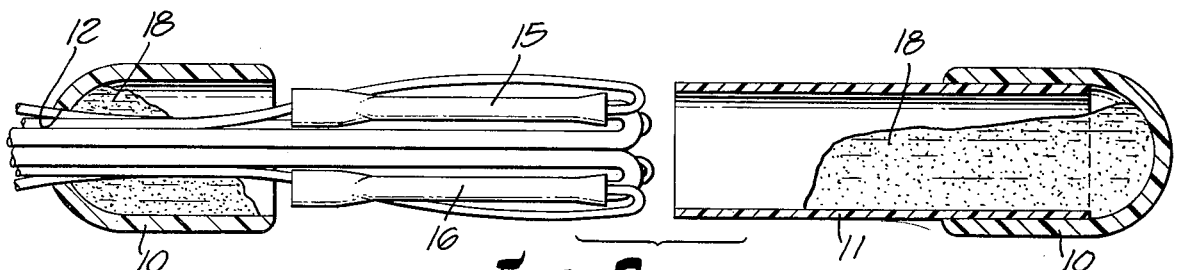
FIG. 3.
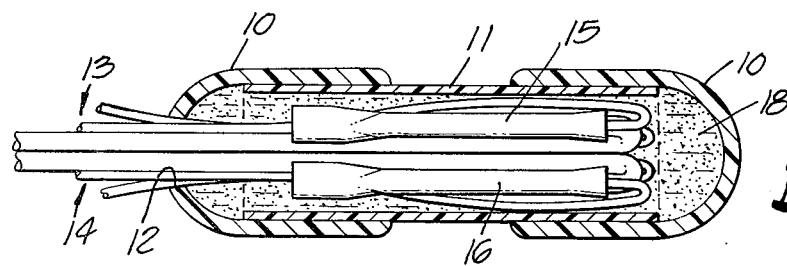
FIG. 4.
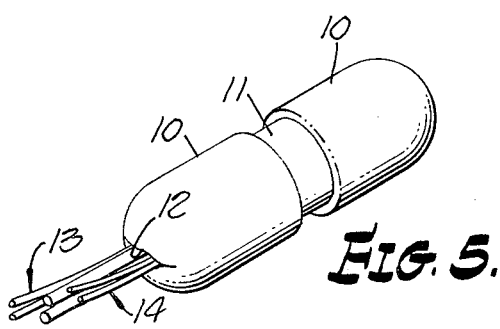
FIG. 5.
JOHN T. THOMPSON
GEORGE W. GILLEMOT
INVENTORS.
BY 
ATTORNEYS

ENCAPSULATED SPLICE ASSEMBLY AND METHOD

This application is a continuation of our application Ser. No. 352,914, filed Apr. 20, 1973, and now abandoned. Ser. No. 352,914 was a continuation of our application Ser. No. 159,714, filed July 6, 1971, and now abandoned.

This invention relates to a protective enclosure for spliced electrical conductors, and more particularly to a simple, inexpensive splice enclosure formed of telescopically assembled cup-shaped members precharged with gel-like water-repellant potting compound and held assembled by the cohesive properties of the gel.

There have been many proposals heretofore for protecting spliced conductors from injury, contact with other objects and particularly from contamination by liquids, corrosive mediums and the like. Some of these proposals are quite satisfactory from a protective viewpoint but the enshrouding and encapsulating expedients are so effective that it is substantially impossible from a practical standpoint to gain access to the splice connection for inspection, testing or servicing without destruction of the protective enclosure. Other expedients utilizing impervious splice enclosures remain effective for a prolonged period but, under adverse conditions or greatly extended periods of use, moisture eventually finds its way into the interior of the housing and causes degradation of the insulation surrounding the conductors with the result that unacceptable leakage and loss of the electrical integrity of the splice occurs. These losses may be tolerable for certain applications, but in other highly sophisticated operating environments even a very small loss in signal strength can cause unacceptable operating results or actual malfunctioning or nonfunctioning of the equipment.

Many environments also have need for a foolproof, inexpensive, readily assembled splice junction which is readily re-enterable any time for inspection, checking or modification of the circuitry and which can be reclosed expeditiously and without risk of adversely affecting the waterproofness and the electrical insulating characteristics or integrity of the assembly.

The foregoing and other shortcomings of prior splice assemblies and techniques are eliminated by the present invention which is particularly suitable for use with junctions between smaller insulated conductors. The technique employs a pair of deep, cup-shaped housing members of supple, pliant, elastomeric material sized to have a snug telescopic fit with one another and closely embracing the splice junction proper. At the time of assembly, an end of one of the enclosure members is slit crosswise sufficiently to permit insertion of the conductor ends. These ends are spliced together within a small snug-fitting protective sheath of a material which can be crushed flat or heat-shrunk about the splice. The opposite inner ends of the cup-shaped members are charged with sufficient water-repellant non-setting, gel-like potting compound to occupy the remainder of the enclosure when the parts are telescoped together with the wire junctions immersed in the gel. No moisture can penetrate the water-repellant gel and the highly cohesive characteristics of the gel aid very materially in holding the housing parts frictionally in assembled relation until forcibly pulled apart when re-entry of the housing becomes desirable. The housing can be reclosed and re-opened repeatedly should this be necessary without adversely affecting the efficiency and effectiveness of the assembly when reclosed.

Accordingly, it is a primary object of the present invention to provide an improved, splice encapsulating assembly and technique for encapsulating electrical splice junctions.

Another object of the invention is the provision of a separable splice housing for wire junctions formed from a pair of cup-shaped members held telescopically assembled about the splice by a frictional fit and by the cohesiveness of its contained charge of high-tenacity, water-repellant, non-setting, gel-like potting compound.

These and other more specific objects will appear upon reading the following specification and claims and upon considering in connection therewith the attached drawing to which they relate.

Referring now to the drawing in which a preferred embodiment of the invention is illustrated:

FIG. 1 is an exploded perspective view of a typical embodiment of the splice housing of the invention prior to assembly;

FIG. 2 is a perspective view partly in section showing two splice assemblies assembled through one of the housing end members;

FIG. 3 is an exploded view of the splice assembly of the invention in readiness for telescopic assembly;

FIG. 4 is a cross-sectional view through a completed splice assembly; and

FIG. 5 is a perspective view on a smaller scale of the FIG. 4 assembly.

Referring initially, more particularly, to FIGS. 1 and 2, there is shown the components of the housing assembly of the invention ready for use and including a pair of identical deep cup-shaped members 10,10 in alignment with the opposite ends of an intervening open-ended tube 11. Each of these components is made of a suitable, supple, pliant, elastomeric material such as a rubber compounds or a soft, semirigid, thermoplastic composition. The internal diameter of the two end caps is selected to have a snug, frictional fit over the exterior of tubular member 11. Any of a wide variety of thermoplastic material such as polyethylene, polyvinylchloride and other thermoplastic compositions are suitable. The material should have excellent temperature characteristics and be immune from attack by fluids and chemicals encountered in the vicinity of electrical equipment.

Although the housing is shown in the present drawings as comprising three parts, it will be understood that two cup-shaped members formed similarly to the two housing sub-assemblies shown in FIG. 3 have all of the advantages of the three-part construction and are equally satisfactory. The principal advantage of the three-part construction is that the two end members 10,10 can be identical and used with any desired length of tubing 11 cut from continuous stock.

The first step in the assembly operation is to form a slit 12 with a sharp blade diametrically of the end of member 10 and of the requisite length. Member 10 is then grasped between the thumb and forefinger and squeezed opposite the ends of slit 12 to partially collapse member 10 thereby expanding the sidewalls of the slit away from one another while inserting the free ends of the conductors therethrough in either unspliced or spliced enshrouded condition.

When this has been accomplished, the pressure is released to allow the wall edges to collapse toward one another and into firm contact with the two sets of conductors 13,14. As here shown, each set of conductors 13,14 comprises three small gauge insulated wires spliced together in a well known conventional manner and then inserted into flattened tubular protective members 15,16 of a conventional type. These protective shrouds are crushed or heat-shrunk snugly about the splice junction as best shown in FIG. 2.

Before encapsulating the spliced junctions 15,16 major portions of the inner ends of the two housing parts are charged with a quantity 18 of a well known encapsulating gel-like composition readily obtainable in the marketplace and well known for its water-repellant, non-setting, high insulating characteristics. This gel retains its thick, non-flowing, gel-like consistency over a wide temperature range extending beyond either end of the range normally encountered by splice assemblies. This gel has outstanding tenacity and cohesiveness and remains strongly adherent to any surface brought into contact therewith. It is completely non water-absorbent and water-repellant. Unequal charges of the gel are preferably introduced into the two housing halves and adequate in the aggregate quantity thereof to completely fill the interior of the housing when the end caps are telescoped to their fully assembled position. Prior to introducing the terminals into the gel, the two splice junctions 15,16 are preferably bent back against the respective groups of wires in the manner shown in FIG. 3, and compressed together between the thumb and finger as the leading end is fen into the open end of the longer end cap subassembly. Thereafter the two housing parts are gradually telescoped together as the trapped air collects along the upper interior side of the housing and escapes from between the telescoped surfaces. Meanwhile the gel is forced about all surfaces on the interior of the enclosure until the rise in gel pressure causes some to exude through slit 12. The operator then knows that the gel is thoroughly distributed and that all surfaces of the splice unit itself are immersed in and encapsulated by the gel.

Should there be need to re-enter, the operator grasps the lip edges of the two end caps and pulls them axially apart until the two halves are separated. Excess gel is then wiped from splice enclosures 15,16 and the desired test or other service operation is performed Thereafter the splice terminals are re-processed and inserted back into new charges of gel 18,18 in the same manner described above in connection with FIGS. 3 and 4. This operation may be repeated many times without detracting from the effectiveness or efficiency of the reassembled encapsulated unit.

While the particular encapsulated splice assembly and method herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

We claim:

1. That method of encapsulating a splice junction between a plurality of conductors in a waterproof manner in a re-enterable housing which comprises: splicing the bare ends of a plurality of conductors together, inserting the spliced conductors through an opening therefor in the end wall of a cup-shaped housing member, telescoping said cup-shaped member over the end of a cooperating second housing member having a snug fit with said cup-shaped member, and excluding moisture and air from said assembled housing members by introducing thereinto, prior to assembly of said housing members, charges of encapsulating permanently gel-like potting composition having waterproof and pronounced cohesive characteristics highly effective in holding said housing members telescoped together without need for clamps or fasteners and adapted to fill the interiors of said housing members.

2. A readily re-enterable encapsulated conductor splice assembly for electrical conductors comprising, a plurality of conductors in side by side relation and spliced together at their adjacent ends, a splice housing enclosing the spliced ends of said conductors, said housing including a pair of cup-shaped members at least one of which is formed of pliant elastomeric material having their inlet ends telescoped together, the bottom of said one of said members being slit crosswise thereof with said conductors extending outwardly therethrough and in close wiping contact with the edges of said slit, and the interior of said splice housing being filled with permanently gel-like potting composition having waterproof and pronounced cohesive characteristics highly effective in holding said housing members assembled about the spliced conductor ends encapsulated therein.

3. A splice assembly as defined in claim 2 characterized in that said spliced conductor ends include an elongated flattened tubular shroud having a leading end of reduced size and readily insertable through said slit from the exterior side thereof.

4. A splice assembly as defined in claim 2 characterized in that said spliced conductor ends are bent backwardly through a reverse bend angle of 180° with the spliced end of the conductors remote from said return bend and adjacent said split.

5. A splice assembly including: a protective housing for spliced conductor ends comprising a pair of deep cup-shaped members of nonconductive material having their open ends telescoped one over the other, at least one of said members being formed of pliable material and the bottom thereof being slit generally diametrically thereof; and a plurality of spliced conductor ends extending through said slit with the edges of said slit pressed against the exteriors of said conductor ends with said conductor ends held flattened in side-by-side relation crosswise of said slit, said spliced conductor ends including shroud means thereon and being bent backwardly through a reverse bend of 180° adjacent the point of entry into said shroud means so that said shroud means lies closely beside the adjacent portion of said conductor ends with the reverse bend remote from the slit bottom of the cup-shaped member.

6. That method of encapsulating a splice junction between a plurality of conductors in a waterproof manner without interference with accessibility to the splice which comprises: providing the closed end of one of a pair of deep cup-shaped members of pliant supple material, which members are sized for telescopic assembly of their open ends, with a short slit generally diametrically thereof, inserting the ends of conductors to be spliced through said slit and completing a splice between the ends of the conductors, the completion of the splice between the ends of the conductors including the step of telescoping a short length of flattened tubular shroud over the spliced conductor ends and bending the shrouded end of said splice backwardly to lie beside the contiguous portions of said conductors, charging a quantity of water-repellant non-setting potting compound into the inner end of at least one of said members and then telescoping said members together about the spliced ends of the conductors to encapsulate the splice in said potting compound and seal the same against the entry of moisture.

* * * * *